Feb. 26, 1963   J. C. GOULD ET AL   3,078,563
METHOD OF BONDING ALUMINUM TO STEEL BY ROLL PRESSURE
Filed Oct. 23, 1959
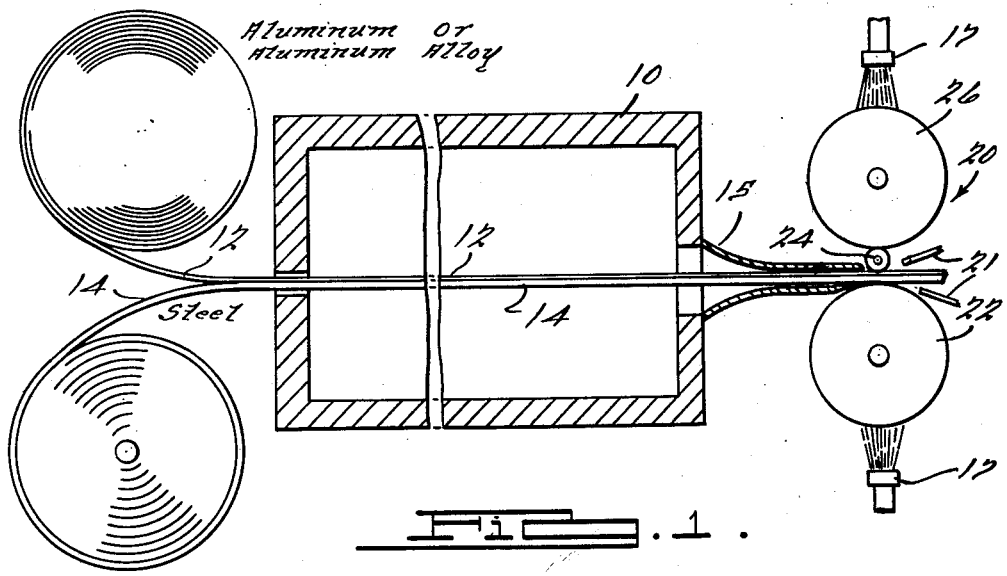
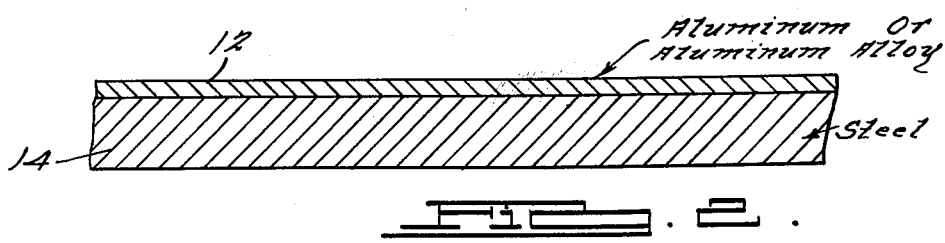
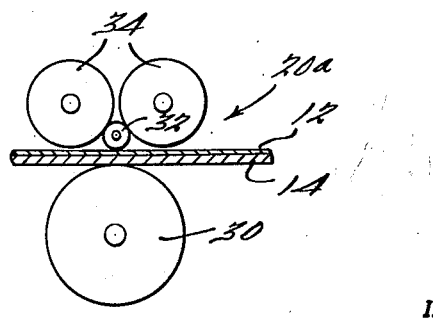
INVENTORS.
James C. Gould
Gordon J. le Brasse
BY Victor Gallatin.
ATTORNEYS.

3,078,563
METHOD OF BONDING ALUMINUM TO STEEL BY ROLL PRESSURE

James C. Gould, Gordon J. Le Brasse, and Victor Gallatin, Ann Arbor, Mich., assignors to Federal-Mogul-Bower Bearings, Inc., Detroit, Mich., a corporation of Michigan
Filed Oct. 23, 1959, Ser. No. 848,392
10 Claims. (Cl. 29—494)

This invention relates generally to a method of forming composite bearing metal and more particularly to an improved method of roll bonding aluminum to steel.

A composite aluminum and steel bearing is very desirable in many installations because it has high fatigue life and load-carrying capacity and is corrosion resistant. Such a bearing material is formed by heating strips of aluminum and steel followed by rolling of the strips together to metallurgically bond the engaging faces of the strips. The roll pressures required to effect the bond cause reductions in the thicknesses of the strips, and this working of the steel strip causes hardening of the steel. Since the reduction in many cases takes place at temperatures between 600 and 900 degrees F., which is in the "blue brittle range" in which working of low carbon steels causes magnified work hardening effects, any working of the steel strip results in substantial hardening of the steel. This is objectionable because a bearing formed from a composite strip having a steel layer which is above a certain hardness is difficult to fabricate and machine and some formed bearings made from such a strip are unstable, apparently because the residual stresses which are set up in the bearing during shaping thereof later cause deformation of the bearing.

It is an object of this invention, therefore, to provide a method of manufacturing a composite aluminum and steel strip in which the aluminum is securely bonded to the steel with a minimum increase in steel hardness due to working. It is to be understood that as used herein, the term "aluminum" strip or member includes pure aluminum and the usual bearing alloys which predominate in aluminum such as a 3% cadmium, 1% copper, 1% nickel and balance aluminum, 4% silicon, 1% cadmium and balance aluminum, 7% tin, 2½% silicon, ½% nickel, 1% copper and balance aluminum, and the like.

In this invention, the frictional bonding or solid phase welding of the aluminum and steel strips is accomplished by passing the strips between a pair of rolls, one of which is significantly larger than the other. The larger roll contacts the steel and the small roll engages the aluminum. It is important that for a maximum benefit a high ratio of roll diameters be obtained and that the top roll be as small as possible, to thereby concentrate the composite strip reduction as much as possible in the aluminum strip and provide for as little working of the steel strip as possible. The minimum size of the roll engaging the aluminum provides for the application of a very high unit pressure to the aluminum which is opposed by a very low unit pressure applied to the steel strip over the large area in engagement with the large roll. In other words, the compressing members which contact opposite sides of the contiguous aluminum and steel strips are adjusted as to size so that even though the total forces exerted on the aluminum and steel strips are equal, the unit pressure on the aluminum is significantly higher than the unit pressure on the steel. Consequently, the reduction of the composite strip is mostly in the aluminum to thereby achieve bonding of the strips with a reduced amount of working of the steel. To insure a good bond, the aluminum strip should be reduced in thickness by at least forty percent and preferably at least fifty percent. The steel and aluminum strips are heated to a temperature such that at the instant of bonding the temperature at the engaging strip faces does not exceed about 950° F. for it has been found that above that temperature a very brittle aluminum iron alloy forms at the interface. However, if the strips are not heated to a sufficiently high temperature, the aluminum is not as resilient and some of the cushioning effect thereof on the steel is lost so that the steel cannot be prevented from hardening to an extent such that less than optimum conditions are obtained in the resulting composite strip.

Further objects, features and advantages of this invention will become apparent from a consideration of the following description, the appended claims and the accompanying drawing in which:

FIGURE 1 is a diagrammatic view of the apparatus utilized for bonding in the method of this invention;

FIGURE 2 is a cross section of the composite strip obtained using the method of this invention; and FIGURE 3 is a diagrammatic illustration of a modified roll assembly usable in the method of this invention.

With reference to the drawing, the apparatus for carrying out the method of this invention is illustrated in FIGURE 1 as including a controlled atmosphere furnace 10 into which an aluminum or aluminum alloy strip 12 and a steel strip 14 are fed after having been just cleaned and de-greased. The aluminum strip is cleaned by wire brushing, after de-greasing the face to be bonded to the steel, and the corresponding steel face is sanded, after de-greasing, although it is to be understood that the cleaning can be accomplished by well known chemical methods. It is essential that no residue of silica, alumina, or other hard materials be left on the bonding surfaces. The steel usually employed is SAE 1010 type although certain specialized applications require a stiffer steel such as SAE 1020 or 1030 or the like and certain high strength low alloy steels such as those known as Cor-Ten, Man-Ten and Tri-Ten, which are trade names identifying products of the United States Steel Corporation, or their equivalents. The furnace atmosphere is a reducing atmosphere and is obtained by partially burning natural gas (methane) although hydrogen or cracked ammonia can also be used. The two strips 12 and 14 move through the furnace so that both are heated to a predetermined temperature, although it is possible to satisfactorily practice the method of this invention by heating only the steel strip followed by movement of the aluminum strip into contact with the steel strip prior to rolling. The hot steel strip then heats the aluminum strip so that both strips are at the desired pre-heat temperature when they reach the rolls. Since a brittle aluminum iron compound which is detrimental to a good bond forms at the interface at a temperature of about 950° F., the furnace temperature is controlled so that the temperature of the strips is below 950° F. and is preferably about 900° F.

In the furnace 10, the strips 12 and 14 move along parallel paths and emerge from the furnace through a snout 15 which directs the superimposed strips into a roll assembly 20 positioned adjacent the exit end of the furnace 10. The roll assembly 20 is heated to a temperature of between 200 and 600 degrees Fahrenheit by any suitable means such as the heaters shown at 17. Pilot lights 21, or other suitable sources of flame, are disposed adjacent the exit end of the snout 15 so as to burn the gas escaping from the snout 15 and insure the existence of a protective atmosphere around the strips until they emerge from the roll assembly 20. After rolling, the composite strip is cooled and a satisfactory co-extensive metallurgical bond will have been formed between the aluminum layer 12 and the backing steel layer 14.

The rolling step is such that the aluminum stock is reduced at least forty percent and preferably between fifty and seventy-five percent in thickness so that the two strips 12 and 14 are pressed together with considerable force and the structure of the roll assembly 20 for accomplishing this rolling is very important in obtaining the desired composite strip. As shown in FIG. 1, the roll assembly 20 consists of a lower roll 22, an upper roll 24, and a backing roll 26 for the upper roll 24. The upper roll 24, for optimum results, is of a diameter as small as possible, the only factor which limits the smallness of the roll 24 being deformation thereof. On the other hand, the lower roll 22 is of a diameter such that the largest possible ratio of diameters of the rolls 22 to 24 is obtained. Satisfactory bonding of the strips 12 and 14 in accordance with the method of this invention are obtainable when the ratio of the diameter of roll 22 to the diameter of roll 24 is two or more to one although a ratio of five or more to one is preferred. In one embodiment of the invention, the lower roll is about 11″ in diameter and the upper roll 24 is about 2″ in diameter, so that a ratio of substantially 5.5 to 1 is obtained. In another embodiment of the invention, a 7″ diameter lower roll is used and a 1″ diameter upper roll is used. The following table illustrates the results obtained, for different thicknesses of composite strip, for two different roll assemblies proportioned according to this invention and, for comparison purposes, illustrates the poorer results obtained with equal size rolls:

tin alloy, a satisfactory bond of the two strips is obtainable at this low pre-heat temperature without a substantial increase in the hardness of the steel strip, by virtue of the construction of the roll assembly 20 so that the small roll 24 engages the aluminum alloy strip and the larger roll 22 contacts the steel strip.

It is recognized that it is more difficult to maintain the proper protective atmosphere for the steel strip when the furnace 10 is at the lower pre-heat temperature. The formation of any oxide on the bonding face of the steel strip is particularly detrimental in the process of this invention because a minimum of working of the steel is involved and working tends to spread the oxide and expose unoxidized steel at the interface. Consequently, the application of a thin protective coating of nickel, silver, copper, or pure aluminum to the bonding face of the steel prior to entry into furnace 10 may be utilized to insure good bonding of the strips 12 and 14. Such a coating is preferably .0001″ or less in thickness, and nickel is preferred.

In the case of aluminum alloys having lesser percentages of low melting point metals, it is not necessary to lower the pre-heat temperature to about the melting point of the low melting point metal. For example, an aluminum alloy which is 7% tin can be satisfactorily bonded to a steel backing member by merely reducing the pre-heat

ELEVEN INCH DIAMETER LOWER ROLL—TWO INCH DIAMETER UPPER ROLL

| SAE 1010 Steel Thickness, inches | | Percent Reduction Steel Thickness | Steel Hardness | | Composite Strip Thickness, inches | Aluminum Thickness, inches | | Percent Reduction Aluminum Thickness |
|---|---|---|---|---|---|---|---|---|
| Before | After | | Before | After | | Before | After | |
| .092 | .0915 | 0.54 | 62 | 70 | .132 | .009 | .0405 | 59.2 |
| .092 | .091 | 1.09 | 62 | 71 | .1265 | .107 | .0355 | 66.7 |
| .097 | .0955 | 1.5 | 70 | 72 | .108 | .041 | .0125 | 68.75 |
| .0925 | .0905 | 2.16 | 62 | 72 | .104 | .039 | .0135 | 65.4 |
| .087 | .085 | 2.3 | 65 | 75 | .100 | .040 | .015 | 62.5 |
| .055 | .0545 | ----- | 65 | 75 | .066 | .041 | .0115 | 74 |
| .083 | .081 | 2.4 | 59 | 65 | .115 | .070 | .034 | 51.4 |

SEVEN INCH DIAMETER LOWER ROLL—ONE AND FIVE-EIGHTS INCH DIAMETER UPPER ROLL

| 0.0555 | 0.055 | 1.0 | 59 | 63 | 0.078 | 0.060 | 0.023 | 61.6 |
| 0.053 | 0.0525 | 1.0 | 57 | 60 | 0.0755 | 0.060 | 0.023 | 61.6 |
| 0.053 | 0.0515 | 2.8 | 57 | 66 | 0.0705 | 0.060 | 0.019 | 68.3 |

SEVEN INCH DIAMETER LOWER ROLL—SEVEN INCH DIAMETER UPPER ROLL

| 0.0665 | 0.0525 | 21.0 | 59 | 85 | 0.083 | 0.060 | 0.0305 | 49 |
| 0.0665 | 0.050 | 24.8 | 59 | 87 | 0.080 | 0.060 | 0.030 | 50 |
| 0.072 | 0.054 | 25.0 | 56 | 88 | 0.082 | 0.060 | 0.028 | 53 |

In the above tables, steel hardness figures represent readings on the Rockwell B scale.

When the aluminum alloy used is one which includes a large percentage of a metal having a low melting point, the pre-heat temperature must be lowered. If the temperature is too high, the low melting point metal melts out of the alloy and is forced through to the bond line by the rolling operation where it interferes with bonding of the strips 12 and 14. This problem is encountered in high tin aluminum alloys, namely, alloys which are about 15 to 30% tin, which has a melting point of about 450° F. In bonding such an aluminum alloy to a steel strip the pre-heat temperature must be lowered so that the melting point of tin is not substantially exceeded. The pre-heat temperature is adjusted so that the temperature of the strips is just under 450° F. No heating of the rolls 22 and 24 is desirable in this particular case, where the pre-heat temperature is low. Rolling of the strips 12 and 14 at such a lowered temperature requires rolling of the aluminum alloy strip in a less resilient condition than when it is heated to a higher temperature. However, since a high tin alloy is less resistant to deformation than a low temperature about 100° F. to a temperature of about 800° F. Apparently, the amount of tin which melts out is not large enough to adversely affect the bond.

A modified roll assembly 20a which may be substituted for the assembly 20 in the process of this invention is illustrated in FIG. 3. The assembly 20a includes a large diameter lower roll 30, a small diameter upper roll 32, and a pair of backing rolls 34 which are disposed on opposite sides of the upper roll 32 and maintain the upper roll in engagement with the top side of a composite strip formed in the assembly 20a. In both the roll assemblies 20 and 20a the lower roll is maintained as large as possible and the upper roll 32 is as small as possible to provide for the desired reduction of the aluminum layer with a minimum working of the steel layer. In both roll assemblies only the lower roll is driven.

From the above description, it is seen that this invention provides an improved method of roll bonding aluminum to steel which results in a minimum hardening of the steel due to working during bonding. The thicknesses of the steel and aluminum strips may vary over a wide range and many different steels and aluminum alloys can be used as pointed out herein. The majority of bearing applications utilize an SAE 1010 steel, which has a hardness of between 55 to 65 measured on the Rockwell B scale and the method of this invention is usable to bond aluminum and aluminum alloys to this and other steels in an annealed condition with a pickup of ten points or less in steel hardness, measured on the Rockwell B scale. While a ratio of roll diameters and, consequently, a ratio of unit pressures on the aluminum and steel strips, of two or more to one is satisfactory, a ratio of between five to one and seven to one is preferred in a commercial process, considering the desired roll pressures, the roll sizes and the required roll strengths.

It will be understood that the specific construction of the improved method of bonding aluminum to steel by roll pressure which is herein disclosed and described is presented for purposes of explanation and illustration and is not intended to indicate limits of the invention, the scope of which is defined by the following claims.

What is claimed is:

1. The method of forming a composite aluminum and steel bearing strip which comprises preheating said strips, in a reducing atmosphere, arranging said strips in a superimposed engaging relation and applying bonding pressures to opposite sides of said strips by passing said strips through a roll assembly including a pair of rolls of which the one disposed in contact with the aluminum strip is less than one-half the diameter of the roll in contact with the steel strip so that the unit pressure on the aluminum strip is substantially higher than the unit pressure on said steel strip and is sufficient to effect a minimum of forty percent reduction in the thickness of the aluminum strip and a maximum increase in the hardness of the steel strip of about 10 Rockwell B units.

2. The method of forming a composite aluminum and steel bearing strip which comprises preheating said strips, in a reducing atmosphere, arranging said strips in a superimposed engaging relation and applying bonding pressures to opposite sides of said strips by passing said strips through a roll assembly including a pair of rolls of different diameter with the smaller one disposed in contact with the aluminum strip so that the unit pressure on the aluminum strip is at least twice the unit pressure on said steel strip and is sufficient to effect a minimum of forty percent reduction in the thickness of the aluminum strip and a maximum increase in the hardness of the steel strip of about 10 Rockwell B units.

3. The method of forming a composite aluminum and steel bearing strip which comprises preheating said strips, in a reducing atmosphere, arranging said strips in a superimposed engaging relation and applying bonding pressures to opposite sides of said strips by passing said strips through a roll assembly including a pair of rolls of different diameter with the smaller one disposed in contact with the aluminum strip so that the unit pressure on the aluminum strip is at least five times the unit pressure on said steel strip and is sufficient to effect a minimum of forty percent reduction in the thickness of the aluminum strip and a maximum increase in the hardness of the steel strip of about 10 Rockwell B units.

4. The method of forming a composite aluminum and steel bearing member from an aluminum member and a steel member having an initial Rockell B hardness ranging from about 55 to about 75 units without effecting a rise of more than about 10 Rockwell B units in the hardness of the steel member and using a roll assembly which includes a pair of rolls, one of which is at least twice the diameter of the other, comprising preheating said steel and aluminum members in a reducing atmosphere, arranging said members so that one face of the aluminum member is adjacent one face of the steel member, moving said members together between said rolls so that the larger diameter roll engages the steel member and the smaller diameter roll engages the aluminum member with sufficient pressure to effect a minimum of a 40% reduction in the thickness of the aluminum member and roll bond said members together, and controlling the preheat temperature of said members so that the temperature does not exceed 950° F.

5. The method of forming a composite aluminum and steel bearing member from an aluminum member and a steel member having an initial Rockwell B hardness ranging from about 55 to about 75 units without effecting a rise of more than about 10 Rockwell B units in the hardness of the steel member and using a roll assembly which includes a pair of rolls, one of which is at least five times the diameter of the other, comprising preheating said steel and aluminum members to a temperature of between 800° F. and 950° F. in a reducing atmosphere, arranging said members so that one face of the aluminum member is adjacent one face of the steel member, and moving said members together between said rolls so that the larger diameter roll engages the steel member and the smaller diameter roll engages the aluminum member with sufficient pressure to effect a minimum of a 40% reduction in the thickness of the aluminum member and roll bond said members together.

6. The method of forming a composite aluminum and steel bearing member from an aluminum member and a steel member having an initial Rockwell B hardness ranging from about 55 to about 75 units without effecting a rise of more than about 10 Rockwell B units in the hardness of the steel member and using a roll assembly which includes a pair of strip engaging rolls, one of which is at least twice the diameter of the other, and at least one backing roll for said other roll, comprising preheating said steel and aluminum members in a reducing atmosphere to a temperature of between 800° F. and 950° F., arranging said members so that one face of the aluminum member is adjacent one face of the steel member, and moving said members together between said rolls so that the larger diameter roll engages the steel member and the smaller diameter roll engages the aluminum member with sufficient pressure to effect at least a forty percent reduction in thickness of the aluminum member and roll bond said members together.

7. The method of forming a composite bearing strip from a strip of an aluminum alloy which includes about 15 to 30% tin and a steel strip using a roll assembly which includes a first roll and a second roll having a diameter at least twice the diameter of the first roll, said method comprising preheating said strips to a temperature not substantially exceeding the melting point of said tin, passing said strips in a superimposed relation between said rolls so that the aluminum alloy strip is engaged by the first roll and the steel strip is engaged by the second roll with a pressure sufficient to effect a minimum of a forty percent reduction in the thickness of the aluminum alloy strip.

8. The method of forming a composite bearing strip from a strip of an aluminum alloy which includes about 15 to 30% tin and a steel strip using a roll assembly which includes a first roll and a second roll having a diameter at least twice the diameter of the first roll, said method comprising applying a thin protective coating of a metal from the group of nickel, copper, silver and aluminum to the surface of said steel strip which is to be bonded to said aluminum strip, preheating said strips in a reducing atmosphere to a temperature not substantially exceeding the melting point of said tin, passing said strips in a superimposed relation between said rolls so that the aluminum alloy strip is engaged by the first roll and the steel strip is engaged by the second roll with a pressure sufficient to effect a minimum of a forty percent reduction in the thickness of the aluminum alloy strip.

9. The method of forming a composite bearing strip from a strip of an aluminum alloy which includes about 15 to 30% tin and a steel strip using a roll assembly which includes a first roll and a second roll having a diameter at least twice the diameter of the first roll, said method comprising applying a thin protective coating of nickel to the surface of a said steel strip which is to be bonded to said aluminum strip, preheating said strips in a reducing atmosphere to slightly below 450° F., passing said strips in a superimposed relation between said rolls so that the aluminum alloy strip is engaged by the first roll and the steel strip is engaged by the second roll with a pressure sufficient to effect a minimum of a forty percent reduction in the thickness of the aluminum alloy strip.

10. The method of forming a composite aluminum and steel bearing member from an aluminum member and a steel member of a hardness between about 55 and about 70 Rockwell B without effecting a rise in the hardness of the steel member of more than about 10 Rockwell B units and using a roll assembly which includes a pair of strip engaging rolls, one of which is between five and seven times the diameter of the other, and at least one backing roll for said other roll, comprising preheating said steel and aluminum members in a reducing atmosphere to a temperature of between 800° F. and 950° F., arranging said members so that one face of the aluminum member is adjacent one face of the steel member, and moving said members together between said rolls so that the larger diameter roll engages the steel member and the smaller diameter roll engages the aluminum member with sufficient pressure to effect at least a forty percent reduction in thickness of the aluminum member and roll bond said members together.

References Cited in the file of this patent

UNITED STATES PATENTS

| | | |
|---|---|---|
| 46,371 | Mann | Feb. 14, 1865 |
| 2,212,481 | Sendzimir | Aug. 20, 1940 |
| 2,539,248 | Lynch et al. | Jan. 23, 1951 |
| 2,693,121 | Dight | Nov. 2, 1954 |
| 2,763,058 | McCullough et al. | Sept. 18, 1956 |
| 2,782,498 | Mushovic et al. | Feb. 26, 1957 |
| 2,809,422 | Schultz | Oct. 15, 1957 |
| 2,879,587 | Mushovic et al. | Mar. 31, 1959 |
| 2,908,073 | Dulin | Oct. 13, 1959 |

FOREIGN PATENTS

| | | |
|---|---|---|
| 751,164 | Germany | Nov. 24, 1952 |